US011386053B2

United States Patent
Zima et al.

(10) Patent No.: US 11,386,053 B2
(45) Date of Patent: Jul. 12, 2022

(54) AUTOMATIC GENERATION OF A DATA MODEL FROM A STRUCTURED QUERY LANGUAGE (SQL) STATEMENT

(71) Applicant: Google LLC, Mountain View, CA (US)

(72) Inventors: Colin Zima, San Francisco, CA (US); Jonathan Swenson, Santa Cruz, CA (US); Jamie Davidson, Mountain View, CA (US); Julian Hyde, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/071,893

(22) Filed: Oct. 15, 2020

(65) Prior Publication Data

US 2022/0121631 A1    Apr. 21, 2022

(51) Int. Cl.
*G06F 16/21*    (2019.01)
*G06F 16/242*    (2019.01)
*G06F 16/2455*    (2019.01)
*G06F 16/22*    (2019.01)

(52) U.S. Cl.
CPC ........ *G06F 16/212* (2019.01); *G06F 16/2282* (2019.01); *G06F 16/2423* (2019.01); *G06F 16/2456* (2019.01)

(58) Field of Classification Search
CPC ............... G06F 16/212; G06F 16/2282; G06F 16/2423; G06F 16/2456
See application file for complete search history.

(56) References Cited

U.S. PATENT DOCUMENTS

| | | | |
|---|---|---|---|
| 9,684,703 B2 * | 6/2017 | Geary | G06F 16/283 |
| 2014/0280334 A1 * | 9/2014 | LeBlanc | G06F 21/6227 |
| | | | 707/770 |
| 2016/0224594 A1 * | 8/2016 | Chow | G06F 16/2237 |
| 2016/0255139 A1 * | 9/2016 | Rathod | H04L 67/42 |
| | | | 709/203 |
| 2017/0308606 A1 * | 10/2017 | Jonsson | G06F 16/258 |
| 2018/0032560 A1 * | 2/2018 | Fang | G06F 16/2246 |
| 2021/0303569 A1 * | 9/2021 | Morganstern | G06F 16/24535 |

* cited by examiner

*Primary Examiner* — Dangelino N Gortayo
(74) *Attorney, Agent, or Firm* — Honigman LLP; Brett A. Krueger

(57) ABSTRACT

A method for the automatic generation of a data model from an SQL statement includes receiving a single SQL statement in a user interface to a data analytics application, parsing the single SQL statement and extracting from the SQL statement different table references. The method also includes, for each one of the table references, directing a selection of all fields available in a corresponding table and storing the available fields in a collection of fields implicated by each table referenced by the table references. Finally, the method includes generating a data model with the fields in the collection of fields and displaying a view of the data model in a user interface of the data analytics application.

18 Claims, 2 Drawing Sheets

AUTOMATIC GENERATION OF A DATA MODEL FROM A STRUCTURED QUERY LANGUAGE (SQL) STATEMENT

TECHNICAL FIELD

The present disclosure relates to the field of database management and more particularly to the automated generation of a data model.

BACKGROUND

The term database refers to an organized collection of data, stored and accessed electronically by way of a computing system. A database management system (DBMS) in turn is a computer program that provides an interface between the database and one or more end users so as to facilitate the interaction by each end user with the database. A DBMS generally also provides an interface to other computer programs to access the data in the underlying database. Generally, speaking, end users and other computer programs interact with the database through the DBMS using query directives formed in conformance with a corresponding query language such as the venerable structured query language (SQL).

While the very basic use of SQL to query and manage data in a database is of no great difficulty for many end users, formulating more complex SQL queries is not for the faint of heart. More importantly, specifying a query irrespective of the mechanics of the actual query requires a strong understanding of the data in the database and the underlying relationships between the data. To the extent that "reading" the content of a database is not practical, it is known to model a database so that the created database model can then be introspected so as to afford a deeper understanding of the data in the database. Indeed, modern data analytics tools permit not only the modeling of an existing database, but also the formulation of SQL queries to be executed against the database based upon knowledge only supplied by the model.

In this regard, a data model is an abstract model that describes how a database is organized, and guides the construction of queries with respect to the data of the data set. The data model generally contains one or more join graphs whose vertices each reference a table and whose edges reflect join conditions between references to the tables. As well, the join graph may also describe the columns in those tables, columns that are derived from other columns via expressions, collections of columns by which queries are typically sorted, collections of columns by which queries are typically grouped into sub-totals and totals, expressions that are derived by combining column values during the construction of a sub-total or total, and other suggestions for how queries might be formed on the data.

Despite the robust nature of a data model, the introspection of a data model for a database, however, is not alone sufficient to enjoy a complete understanding of the data in a database. In fact, automated database modeling tools generally only are able to produce a database model explicitly mapping to the underlying database including queries previously defined in the model as previously executed against the database through the DBMS for the database. But, so much implicit information remains undiscovered that otherwise might be inferred from the existing data in the database, but which has not yet been explicitly defined.

SUMMARY

Implementations of the present disclosure address deficiencies of the art in respect to data model generation and provide a novel and non-obvious method, system and computer program product for the automatic generation of a data model from an SQL statement.

One aspect of the disclosure provides method for the automatic generation of a data model from a structured query language (SQL) statement. The method includes receiving, at data processing hardware of a host computing system, a single SQL statement in a user interface to a data analytics application. The method also includes parsing, by the data processing hardware, the single SQL statement. The method further includes extracting, by the data processing hardware, different table references from the SQL statement. For each one of the table references, the method includes directing, by the data processing hardware, a selection of all fields available in a corresponding table and storing, by the data processing hardware, the available fields in a collection of fields implicated by each table referenced by the table references. The method also includes generating, by the data processing hardware, a data model with the fields in the collection of fields. The method further includes displaying, by the data processing hardware, a view of the data model in a user interface of the data analytics application.

This aspect of the disclosure may include one or more of the following optional features. In some examples, an alias for one of the fields is extracted from the SQL statement and added to the data model. In some configurations, an expression in the SQL statement is extracted and added to the data model as a derived field Optionally, an order by directive in the SQL statement is extracted and added to the data model as a sorting parameter.

In some examples, the method includes detecting, by the data processing hardware, a syntax error in the SQL statement. Here, the method may include generating, by the data processing hardware, a prompt in the user interface indicating a malformed SQL statement. In some implementations, the method includes identifying, by the data processing hardware, a different data model sharing a common element to the generated data model. In some examples, the method includes extracting from the different data model, by the data processing hardware, a table join not present in the generated data model, and presenting, by the data processing hardware, a prompt in the user interface with the extracted table join.

Another aspect of the disclosure provides a data analytics data processing system configured for the automatic generation of a data model from a structured query language (SQL) statement. The system includes a host computing system having one or more computers, each with memory and at least one processor. Each of the computers is coupled to a database managed by a database management system. The data processing system also includes a data model generation module executing in the memory of the host computing system. The data model generation module includes computer program instructions enabled upon execution in the memory of the host computing system to cause the host computing system to perform operations. One of the operations includes receiving a single SQL statement in a user interface to a data analytics application. Another operation includes parsing the single SQL statement and extracting different table references from the SQL statement Another operation includes, for each one of the table references, directing a selection of all fields available in a corresponding table and storing the available fields in a collection of fields implicated by each table referenced by the table references. The operations also include generating a data model with the fields in the collection of fields and displaying a view of the data model in a user interface of the data analytics application.

This aspect of the disclosure may include one or more of the following optional features. In some examples, an alias for one of the fields is extracted from the SQL statement and added to the data model. In some configurations, an expression in the SQL statement is extracted and added to the data model as a derived field. In some examples, an order by directive in the SQL statement is extracted and added to the data model as a sorting parameter.

In some configurations, the operations further include detecting a syntax error in the SQL statement and generating a prompt in the user interface indicating a malformed SQL statement. In some examples, the operations include identifying a different data model sharing a common element to the generated data model, extracting from the different data model a table join not present in the generated data model, and presenting a prompt in the user interface with the extracted table join.

Another aspect of the disclosure provides a computer program product for the automatic generation of a data model from a structured query language (SQL) statement. The computer program product includes a computer readable storage medium having program instructions embodied therewith. The program instructions are executable by a device to cause the device to perform operations. One operation includes receiving a single SQL statement in a user interface to a data analytics application. Another operation includes parsing the single SQL statement and extracting different table references from the SQL statement. The operations further include, for each one of the table references, directing a selection of all fields available in a corresponding table and storing the available fields in a collection of fields implicated by each table referenced by the table references. Another operation includes generating a data model with the fields in the collection of fields. The operations also include displaying a view of the data model in a user interface of the data analytics application.

This aspect of the disclosure may include one or more of the following optional features. In some examples, an alias for one of the fields is extracted from the SQL statement and added to the data model. In another example, an expression in the SQL statement is extracted and added to the data model as a derived field. In some examples, an order by directive in the SQL statement is extracted and added to the data model as a sorting parameter.

In some configurations, the operations further include detecting a syntax error in the SQL statement and generating a prompt in the user interface indicating a malformed SQL statement. In some examples, the operations further include identifying a different data model sharing a common element to the generated data model, extracting from the different data model a table join not present in the generated data model, and presenting a prompt in the user interface with the extracted table join.

The details of one or more implementations of the disclosure are set forth in the accompanying drawings and the description below. Other aspects, features, and advantages will be apparent from the description and drawings, and from the claims.

DESCRIPTION OF THE DRAWINGS

The accompanying drawings, which are incorporated in and constitute part of this specification, illustrate implementations of the disclosure and together with the description, serve to explain the principles of the disclosure. The implementations illustrated herein are presently preferred, it being understood, however, that the disclosure is not limited to the precise arrangements and instrumentalities shown, wherein.

Like reference symbols in the various drawings indicate like elements.

DETAILED DESCRIPTION

Implementations of the disclosure provide for the automatic generation of a data model from a SQL statement. In accordance with an implementation of the disclosure, one or more SQL statements applicable to a database may be processed to identify one or more table references. For each of the table references, all fields of a corresponding one of the tables may be selected for addition to a data model of the database. Optionally, an alias for one of the tables or fields set forth in a corresponding one of the SQL statements may be added to the data model. As well, an expression present in the corresponding one of the SQL statements can be added to the data model as a derived field. Finally, a sort directive present in a corresponding one of the SQL statements can be added to the data model as a sorting parameter.

Figure 1:
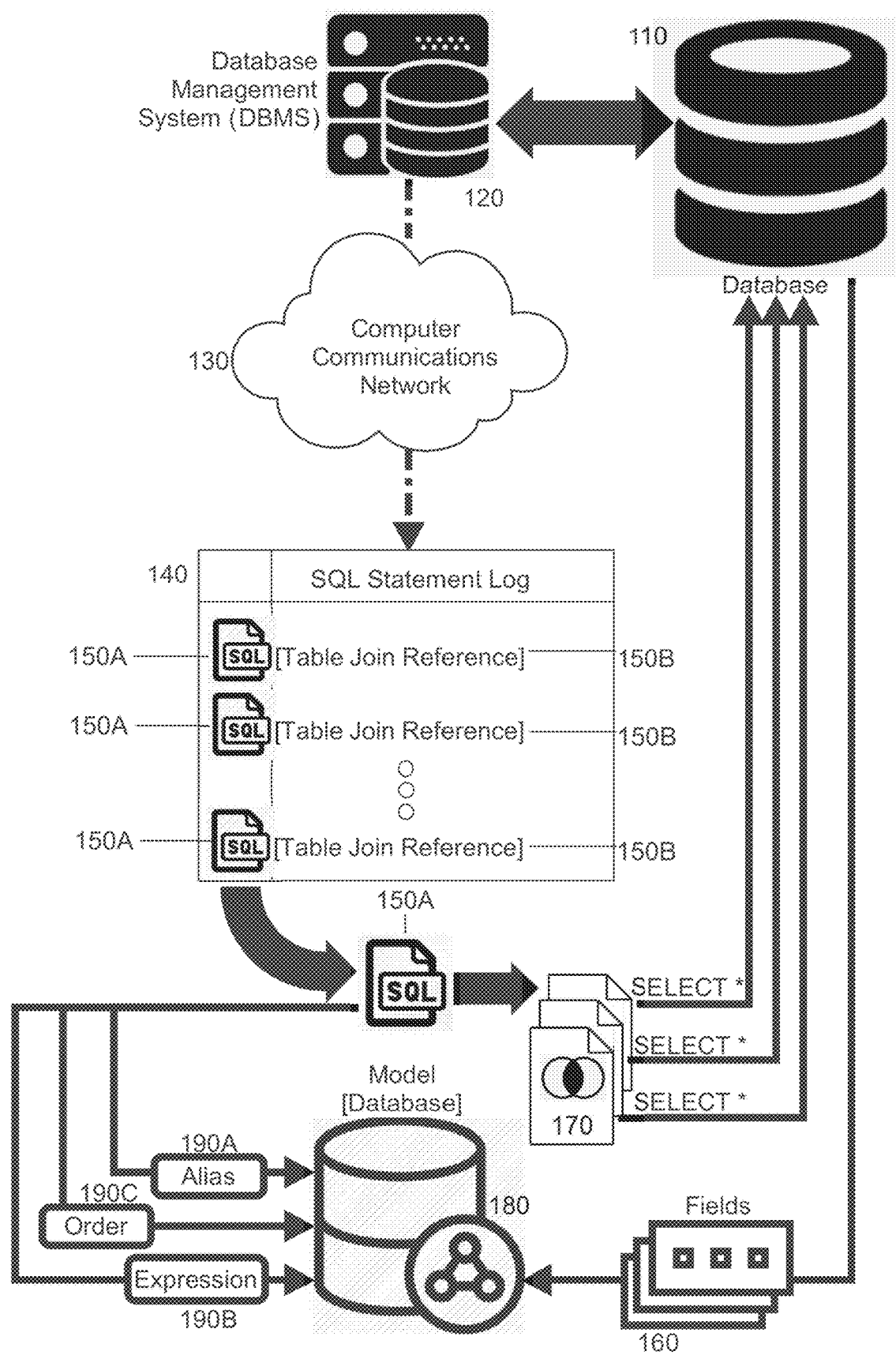
FIG. 1 is a pictorial illustration of a process for the automatic generation of a data model from a SQL statement.

In further illustration, FIG. 1 pictorially shows process for the automatic generation of a data model from a SQL statement. As shown in FIG. 1, different SQL statements 150A each encapsulating a table reference 150B can be discovered within a SQL statement log 140 of SQL statements 150A applied to database 110 by a DBMS 120 from over a computer communications network 130. One of the SQL statements 150A can be selected for processing and one or more tables 170 referenced by a corresponding table reference 150 can be identified. For each of the tables 170, a select all fields directive can be applied to the database 110 by the DBMS 120 in order to retrieve, for each of the tables 170, all implicated fields 160. Those fields 160 then may be added to a data model 180 for the database 110 so as to have produced an automatically generated data model.

Optionally, an alias 190A for one of the fields 160 may be identified within the SQL statement 150A and added to the data model 180. Likewise, an expression 190B present in the SQL statement 150A may be added to the data model 180 as a derived field. Finally, an ordering directive 190C present in the SQL statement 150A may be added to the data model as a sorting parameter. Finally, once the model 180 has been completed, other models (not shown) may be compared to the model 180 to identify common elements. To the extent common elements may be identified, one or more table joins defined within the other models referencing tables not used to generate the model 180 may be used to add additional fields to the data model 180 by selecting all fields in the tables referenced by the table joins of the other models.

Figure 2:
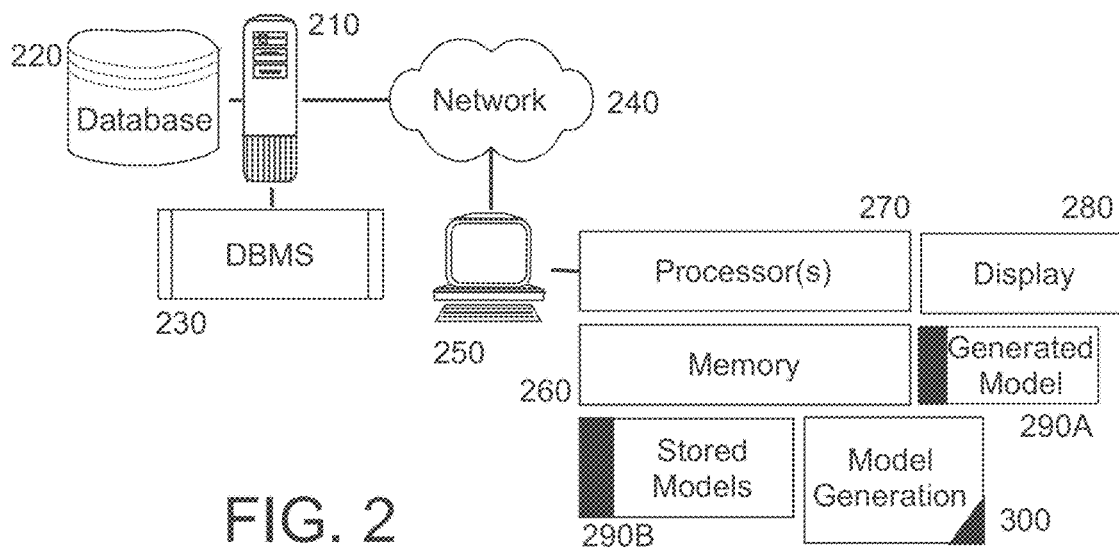
FIG. 2 is a schematic illustration of a data processing system configured for the automatic generation of a data model from a SQL statement; and, FIG. 3 is a flow chart illustrating a process for the automatic generation of a data model from a SQL statement.

The process described in connection with FIG. 1 may be implemented within a data processing system. In yet further illustration, FIG. 2 schematically shows a data processing system configured for the automatic generation of a data model from a SQL statement. The system includes a host computing system 250 that includes one or more processors 270 (i.e., data processing hardware), memory 260 and a display 280. The host computing system 250 is coupled to a remote database server 210 supporting the execution of a DBMS 230 managing interactions with a database 220. The system also includes a model generation module 300 including computer program instructions that execute in the memory 260 of the host computing system 250.

The computer program instructions of the model generation module 300 are operable during execution in the memory 260 to process a SQL query for data in the database 220 processable by the DBMS 230. Specifically, the program instructions parse the SQL query and extract therefrom, one or more table references. For each of the table references, a corresponding table in the database 220 is identified and a SELECT* directive applied to the database 220 by way of the DBMS 230 for the corresponding table in order retrieve all fields of the corresponding table. The program instructions then populate the generated model 290A with the retrieved fields. Optionally, prior to extracting the table references, the program code is enabled to preprocess the SQL query to identify syntax errors and to generate an alert in the display 280 of any identified syntax errors.

Figure 3:
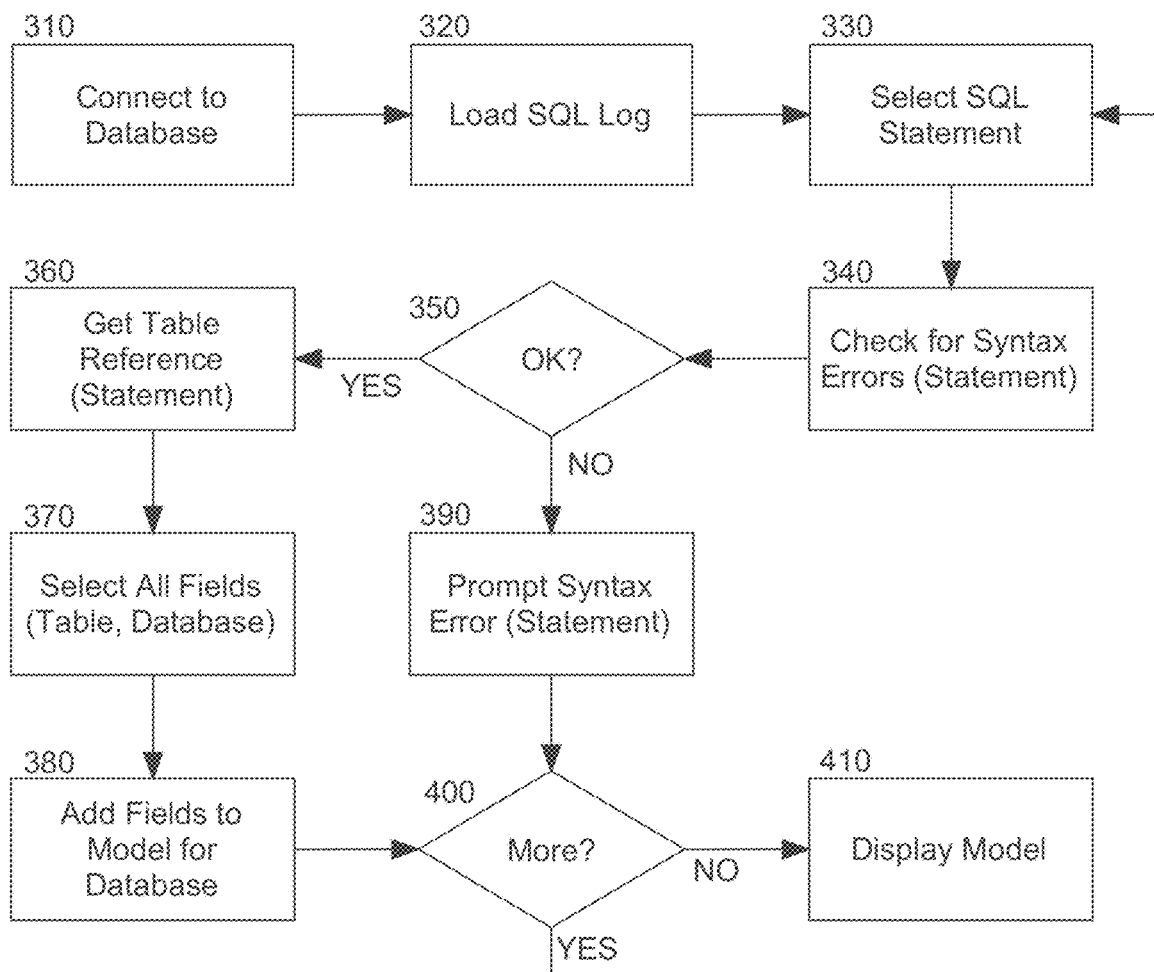

In even yet further illustration of the operation of the model generation module 300, FIG. 3 is a flow chart illustrating a process for the automatic generation of a data model from a SQL statement. Beginning in block 310, a communicative connection is established with a database and in block 320, a set of one or more SQL directives applicable to the database may be received, either through direct manual input into a user interface to the module, or by processing a log of previously applied SQL directives. In either circumstance, in block 330 one of the SQL directives is selected and in block 340, the selected SQL directive is checked for syntax errors. In decision block 350, if no syntax errors are found, the process continues through block 360.

In block 360, a table reference present in the SQL directive is retrieved and in block 370, all fields provided by an associated table are selected by way of a SELECT* directive applied to the database. In block 380, the returned fields are then added to the data model for the database and in decision block 400, if additional SQL directives remain to be processed, the process can return to block 330. Otherwise, the automatically generated data model may be displayed in a user interface to the module in block 410.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The implementation was chosen and described in order to best explain the principles of the disclosure and the practical application, and to enable others of ordinary skill in the art to understand the disclosure for various implementations with various modifications as are suited to the particular use contemplated.

A number of implementations have been described. Nevertheless, it will be understood that various modifications may be made without departing from the spirit and scope of the disclosure. Accordingly, other implementations are within the scope of the following claims.

What is claimed is:

1. A method for automatic generation of a data model from a structured query language (SQL) statement, the method comprising:
    receiving, at data processing hardware of a host computing system, a single SQL statement in a user interface to a data analytics application;
    parsing, by the data processing hardware, the single SQL statement;
    extracting, by the data processing hardware, different table references from the parsed single SQL statement;
    for each one of the extracted different table references:
        directing, by the data processing hardware, a selection of all fields available in a corresponding table; and
        storing, by the data processing hardware, the fields available in a collection of fields implicated by each table referenced by the different table references;
    generating, by the data processing hardware, a data model using the stored fields available in the collection of fields, the data model describing an organization of a database corresponding to the single SQL statement; and
    displaying, by the data processing hardware, a view of the data model in a user interface of the data analytics application.

2. The method of claim 1, wherein an alias for one of the fields available is extracted from the SQL statement and added to the data model.

3. The method of claim 1, wherein an expression in the single SQL statement is extracted and added to the data model as a derived field.

4. The method of claim 1, wherein an order by directive in the single SQL statement is extracted and added to the data model as a sorting parameter.

5. The method of claim 1, further comprising:
    detecting, by the data processing hardware, a syntax error in the single SQL statement; and
    generating, by the data processing hardware, a prompt in the user interface indicating a malformed SQL statement.

6. The method of claim 1, further comprising:
    identifying, by the data processing hardware, a different data model sharing a common element to the generated data model;
    extracting from the different data model, by the data processing hardware, a table join not present in the generated data model; and
    presenting, by the data processing hardware, a prompt in the user interface with the extracted table join.

7. A data analytics data processing system configured for automatic generation of a data model from a structured query language (SQL) statement, the system comprising:
    a host computing system comprising one or more computers, each with memory and at least one processor, and coupled to a database managed by a database management system; and
    a data model generation module executing in the memory of the host computing system, the data model generation module comprising computer program instructions enabled upon execution in the memory of the host computing system to cause the host computing system to perform operations comprising:
        receiving a single SQL statement in a user interface to a data analytics application;
        parsing the single SQL statement and extracting different table references from the parsed single SQL statement;
        for each one of the extracted different table references:
            directing a selection of all fields available in a corresponding table; and
            storing the fields available in a collection of fields implicated by each table referenced by the different table references;
        generating a data model using the stored fields available in the collection of fields, the data model describing an organization of a database corresponding to the single SQL statement; and
        displaying a view of the data model in a user interface of the data analytics application.

8. The system of claim 7, wherein an alias for one of the fields available is extracted from the single SQL statement and added to the data model.

9. The system of claim 7, wherein an expression in the single SQL statement is extracted and added to the data model as a derived field.

10. The system of claim 7, wherein an order by directive in the single SQL statement is extracted and added to the data model as a sorting parameter.

11. The system of claim 7, wherein the operations further comprise:
    detecting a syntax error in the single SQL statement; and
    generating a prompt in the user interface indicating a malformed SQL statement.

12. The system of claim 7, wherein the operations further comprise:
    identifying a different data model sharing a common element to the generated data model;
    extracting from the different data model a table join not present in the generated data model; and
    presenting a prompt in the user interface with the extracted table join.

13. A computer program product for automatic generation of a data model from a structured query language (SQL) statement, the computer program product encoded on a non-transitory computer readable storage medium comprising program instructions that when executed by a data processing apparatus cause the data processing apparatus to perform operations comprising:
    receiving a single SQL statement in a user interface to a data analytics application;
    parsing the single SQL statement and extracting different table references from the parsed single SQL statement;
    for each one of the extracted different table references:
        directing a selection of all fields available in a corresponding table; and storing the fields available in a collection of fields implicated by each table referenced by the different table references;

generating a data model using the stored fields available in the collection of fields, the data model describing an organization of a database corresponding to the single SQL statement; and displaying a view of the data model in a user interface of the data analytics application.

14. The computer program product of claim 13, wherein an alias for one of the fields available is extracted from the single SQL statement and added to the data model.

15. The computer program product of claim 13, wherein an expression in the single SQL statement is extracted and added to the data model as a derived field.

16. The computer program product of claim 13, wherein an order by directive in the single SQL statement is extracted and added to the data model as a sorting parameter.

17. The computer program product of claim 13, wherein the operations further comprise:

detecting a syntax error in the single SQL statement; and generating a prompt in the user interface indicating a malformed SQL statement.

18. The computer program product of claim 13, wherein the operations further comprise:

identifying a different data model sharing a common element to the generated data model;

extracting from the different data model a table join not present in the generated data model; and presenting a prompt in the user interface with the extracted table join.

\* \* \* \* \*